United States Patent
Suzuki

(10) Patent No.: US 8,151,922 B2
(45) Date of Patent: Apr. 10, 2012

(54) EXHAUST APPARATUS OF VEHICLE

(75) Inventor: Takehiro Suzuki, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 297 days.

(21) Appl. No.: 12/587,774

(22) Filed: Oct. 13, 2009

(65) Prior Publication Data

US 2010/0101883 A1    Apr. 29, 2010

(30) Foreign Application Priority Data

Oct. 29, 2008  (JP) .................................. 2008-277716

(51) Int. Cl.
*B60K 13/04* (2006.01)
(52) U.S. Cl. ...................................................... 180/89.2
(58) Field of Classification Search .................. 180/89.2
See application file for complete search history.

(56) References Cited

FOREIGN PATENT DOCUMENTS

JP         57-179525         11/1982

*Primary Examiner* — Eric Culbreth
(74) *Attorney, Agent, or Firm* — Flynn, Thiel, Boutell & Tanis, P.C.

(57) ABSTRACT

An exhaust apparatus includes an exhaust pipe passing under the front floor and rear floor and extending toward the rear of the vehicle. A noise eliminator is arranged under the rear floor and a fuel tank is arranged in a side portion in the vehicle width direction of the noise eliminator. A portion of the exhaust pipe on the front side of the front floor and a portion on the rear side of the noise eliminator are elastically mounted to the vehicle body. The exhaust pipe and a portion on the side opposite to the side of the fuel tank at a lower surface portion of the front floor are coupled by a metal wire having slack in an intermediate portion therebetween. In a side impact to the vehicle body, the fuel tank and noise eliminator do not interfere with each other.

2 Claims, 5 Drawing Sheets

PRIOR ART

EXHAUST APPARATUS OF VEHICLE

FIELD OF THE INVENTION

The invention relates to an exhaust apparatus of a vehicle in which a plurality of portions of an exhaust pipe extending in the rearward of the vehicle from an engine are elastically supported to a vehicle body by mounting.

BACKGROUND OF THE INVENTION

Prior art FIG. 5 is a bottom view of a vehicle showing an exhaust apparatus. A pair of left and right side panels 104L and 104R extending in a vehicle front/rear direction are arranged between a pair of left and right front wheels 102L and 102R and a pair of left and right rear wheels 103L and 103R of a vehicle 101. A front floor 105 and a rear floor 106 coupled with a rear edge portion of the front floor through a vertical wall portion (not shown) are arranged between both of the side panels 104L and 104R.

An exhaust manifold 109 of an engine 108 mounted between the left and right front wheels 102L and 102R is collectively connected to a catalytic converter 110. An exhaust pipe 111 is connected to the catalytic converter 110 through a spherical joint 112. The exhaust pipe 111 is extended toward a rear portion of the vehicle in a tunnel portion 105a formed in the front floor 105 and under the rear floor 106. A sub-chamber 113 is attached to a halfway portion of the exhaust pipe 111 which passes through the tunnel portion 105a. A noise eliminator 114 is attached to a portion of the exhaust pipe 111 which passes under the rear floor 106. A fuel tank 115 is arranged at or adjacent a left side portion of the noise eliminator 114.

The exhaust pipe 111 is elastically supported to the vehicle body by mounting (not shown) at the following four points in total: one point P1' at a portion of the pipe on the front side of the front floor 105; two points P2' and P3' at the front and rear edges of the noise eliminator 114; and one point P4' at a rear edge portion of the pipe rearwardly of the noise eliminator 114 as shown in FIG. 5. However, since vehicle body sensitivity is high and vibration that is propagated to the vehicle body increases or in terms of a layout, there is a case where the one point (point on the front side of the noise eliminator 114) P2' of the exhaust pipe 111 cannot be supported.

The following construction has been disclosed in Japanese Utility Model Application Laid-Open No. 57-179525: an exhaust pipe of a vehicle having a flexible tube for vibration isolation, in which a stopper wire is stretched between a front edge portion of a muffler (noise eliminator) provided for the exhaust pipe and a portion near a rear edge upper portion of the muffler of the vehicle. The construction enables a front edge side of the exhaust pipe including the muffler, to swing upward without largely moving forward when a rear edge or end of the exhaust pipe has collided and thus avoid a buckling deformation of the flexible tube.

In the exhaust apparatus shown in prior art FIG. 5, there is a problem in that when the one point P2' of the exhaust pipe 111 (point of the front edge or end of the noise eliminator 114) cannot be supported for the foregoing reason. If an impact force F on the left side acts on the vehicle body from a collision on the left side of the vehicle 101, although the noise eliminator 114 remains at the original position by an inertia at the moment of the collision, the fuel tank 115 is moved to the right together with the vehicle body, so that the fuel tank 115 interferes with the noise eliminator 114. Such a problem cannot be solved by the construction proposed in JP Utility Model 57-179525.

The invention is made in consideration of the foregoing problem and it is an object of the invention to provide an exhaust apparatus for a vehicle in which even if an impact was applied to a vehicle body from a side surface, an interference between a fuel tank and a noise eliminator is prevented, and thus the fuel tank can be protected.

SUMMARY OF THE INVENTION

To accomplish the above object, there is provided an exhaust apparatus of a vehicle in which:

a pair of right and left side panels extending in a vehicle front/rear direction are arranged between front wheels and rear wheels;

a front floor and a rear floor coupled with a rear edge portion of the front floor through a vertical wall portion are arranged between both of the side panels;

an exhaust pipe connected through a spherical joint to an engine mounted between the right and left front wheels is extended from the engine to a rear portion of the vehicle through positions under the front floor and the rear floor;

a noise eliminator is arranged in a portion of the exhaust pipe which passes under the rear floor;

a fuel tank is arranged in a side portion in a vehicle width direction of the noise eliminator; and a front portion of the exhaust pipe on the front side of the front floor and a rear portion of the exhaust pipe on the rear side of the noise eliminator are elastically mounted to a vehicle body.

In some embodiments, the exhaust pipe and a portion on the side opposite to the side where the fuel tank has been arranged in the vehicle width direction for the exhaust pipe in a lower surface portion of the front floor are coupled by a metal wire having slack in an intermediate portion.

In some embodiments, metal wire is arranged in a tunnel portion formed in the front floor and projecting upward.

In some embodiments, the tunnel portion is reinforced by an arch-shaped reinforcing member and one end of the metal wire is coupled with the reinforcing member.

In operation, when an impact force has acted on a side panel of the vehicle from the side, although the exhaust pipe which has elastically been supported at a position away from the side panel remains there by an inertia, the fuel tank is pressed by the side panel and moves toward the noise eliminator side. However, since the front floor also moves in the same direction and stretches the metal wire whose one end has been coupled with the front floor, the exhaust pipe and the noise eliminator provided for the exhaust pipe are forcedly moved in the moving direction of the front floor. Therefore, interference between the fuel tank and the noise eliminator is prevented and the fuel tank is protected. Since the metal wire is ordinarily in a slack condition, vibration of the exhaust pipe is not propagated to the front floor side through the metal wire and vibration of the vehicle body can be suppressed.

Since the metal wire is arranged in the tunnel portion formed in the front floor, the metal wire is not projected downwardly from a bottom surface of the vehicle body and, upon running of the vehicle, the metal wire does not come into contact with an obstacle on the ground.

Moreover, since the tunnel portion is reinforced by the arch-shaped reinforcing member, when a load acts on the side panel from the side, the deformation of the tunnel portion is suppressed by the reinforcing member, a coupling point of the metal wire with the front floor can be moved in the acting direction of the load without being obstructed by the tunnel portion, and the metal wire can be stretched.

DETAILED DESCRIPTION OF THE INVENTION

Embodiments of the invention will be described hereinbelow with reference to the drawings.

Figure 1:
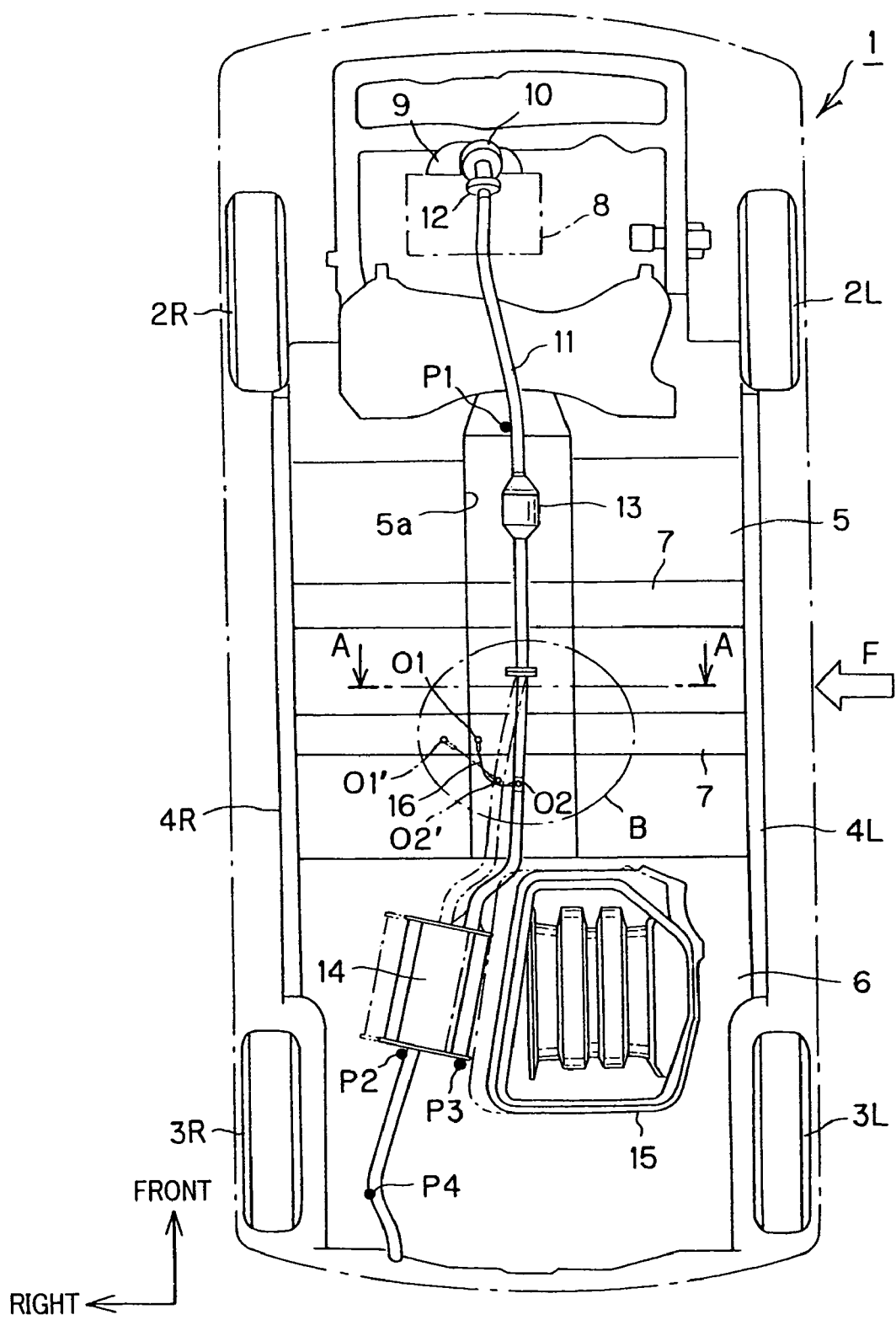
FIG. 1 is a bottom view of a vehicle having an exhaust apparatus according to the invention.
Figure 2:
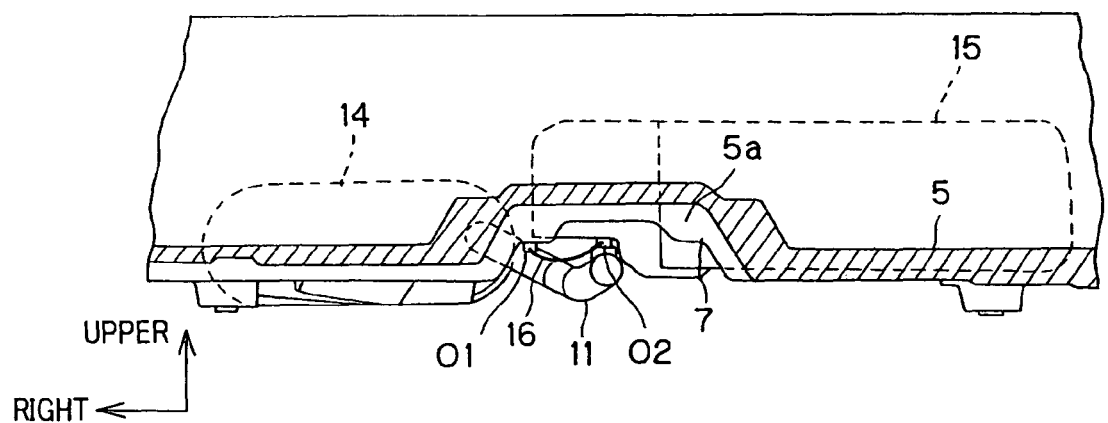
FIG. 2 is a cross sectional view taken along the A-A line in FIG. 1.
Figure 3:
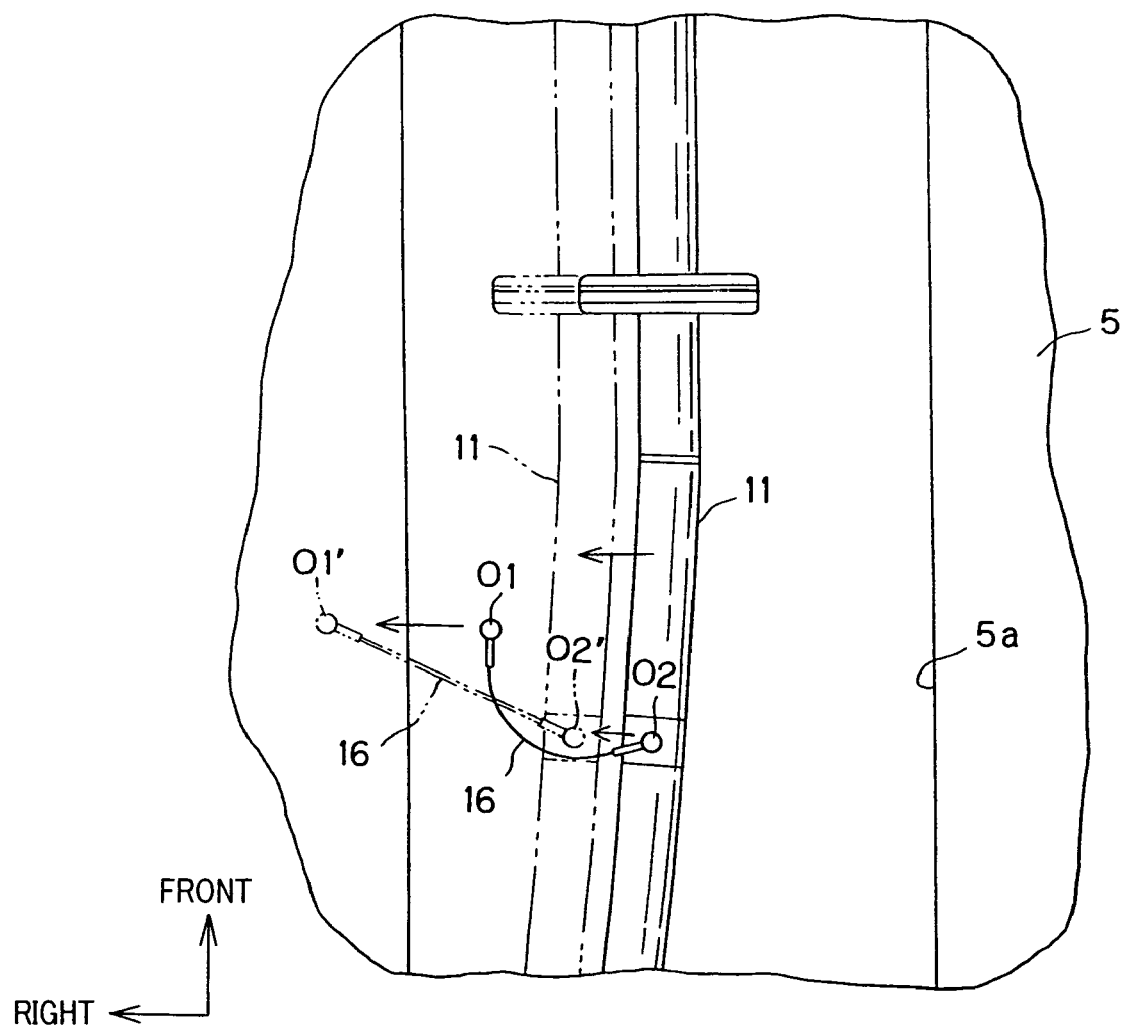
FIG. 3 is an enlarged detailed diagram of portion B in FIG. 1.
Figure 4:
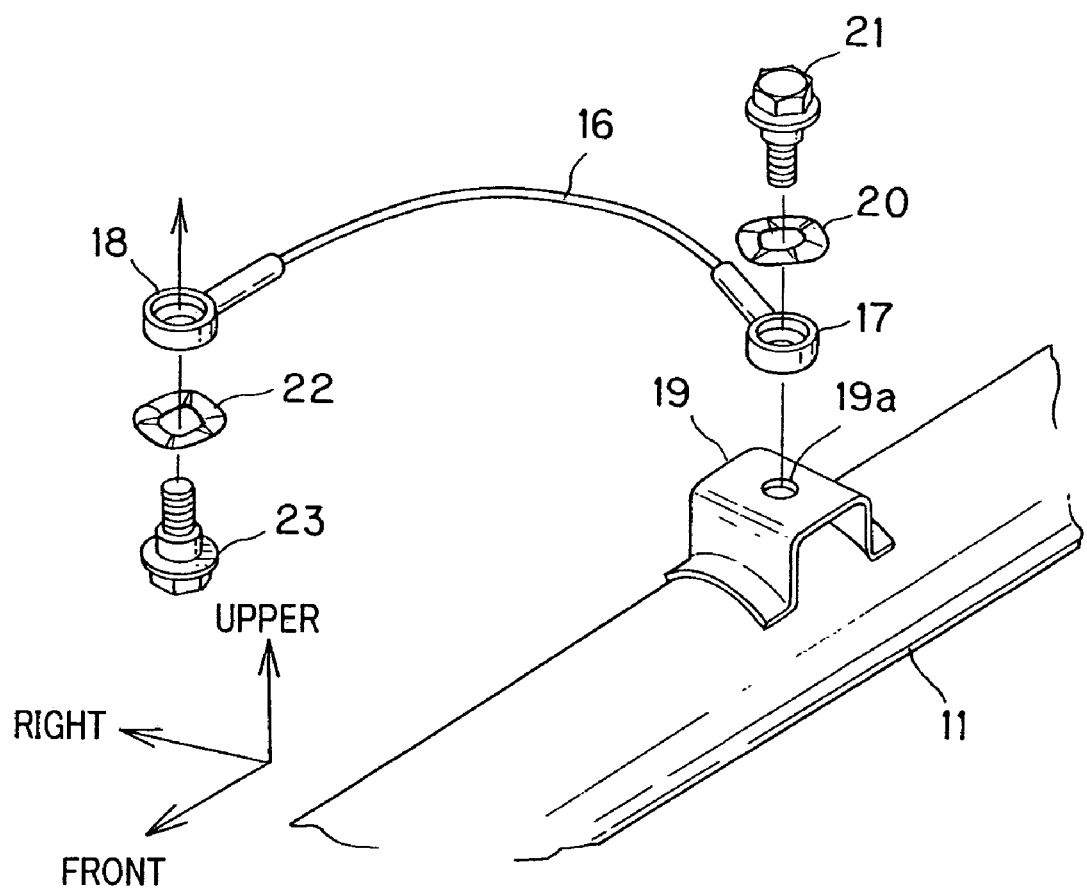
FIG. 4 is an exploded perspective view showing a coupling structure of a wire made of a metal of the exhaust apparatus according to the invention.

FIG. 1 is a bottom view of a vehicle having an exhaust apparatus according to the invention. FIG. 2 is a cross sectional view taken along the A-A line in FIG. 1. FIG. 3 is an enlarged detailed diagram of portion B in FIG. 1. FIG. 4 is an exploded perspective view showing a coupling structure of a wire made of a metal.

In a vehicle 1 shown in FIG. 1, a pair of left and right side panels 4L and 4R extending in the vehicle front/rear direction are arranged between a pair of left and right front wheels 2L and 2R and a pair of left and right rear wheels 3L and 3R. A front floor 5 is arranged in a front former portion between both of the side panels 4L and 4R. A rear floor 6 is coupled with a rear edge portion of the front floor 5 through a vertical wall portion (not shown).

As shown in FIG. 2, a concave-shaped tunnel portion 5a which projects upward is formed at the center in the vehicle width direction of the front floor 5. The tunnel portion 5a is reinforced by an arch-shaped reinforcing member 7 suspended laterally between the right and left side panels 4.

An engine 8 serving as a driving source is mounted between the left and right front wheels 2L and 2R. An exhaust manifold 9 connected to a front portion of the engine 8 is collectively connected to a catalytic converter 10. An exhaust pipe 11 is connected to the catalytic converter 10 through a spherical joint 12. The exhaust pipe 11 is extended toward a rear portion of the vehicle in the tunnel portion 5a formed in the front floor 5 and under the rear floor 6. A sub-chamber 13 is attached to a halfway portion of the exhaust pipe which passes through the tunnel portion 5a. A noise eliminator 14 is attached to a portion which passes under the rear floor 6. The noise eliminator 14 is arranged so as to approach the right (to the left in FIG. 1) for a center line in the vehicle width direction.

Further, a fuel tank 15 is arranged in a left side portion of the noise eliminator 14 under the rear floor 6 in a rear portion of the vehicle body.

As shown in FIG. 1, the exhaust pipe 11 is elastically supported to the vehicle body by mounting (not shown) at the following four positions in total: one position at a point P1 of a portion on the front side of the front floor 5; two positions at points P2 and P3 of portions on the rear side of the noise eliminator 14; and one position at a point P4 of a rear edge portion.

Figure 5:
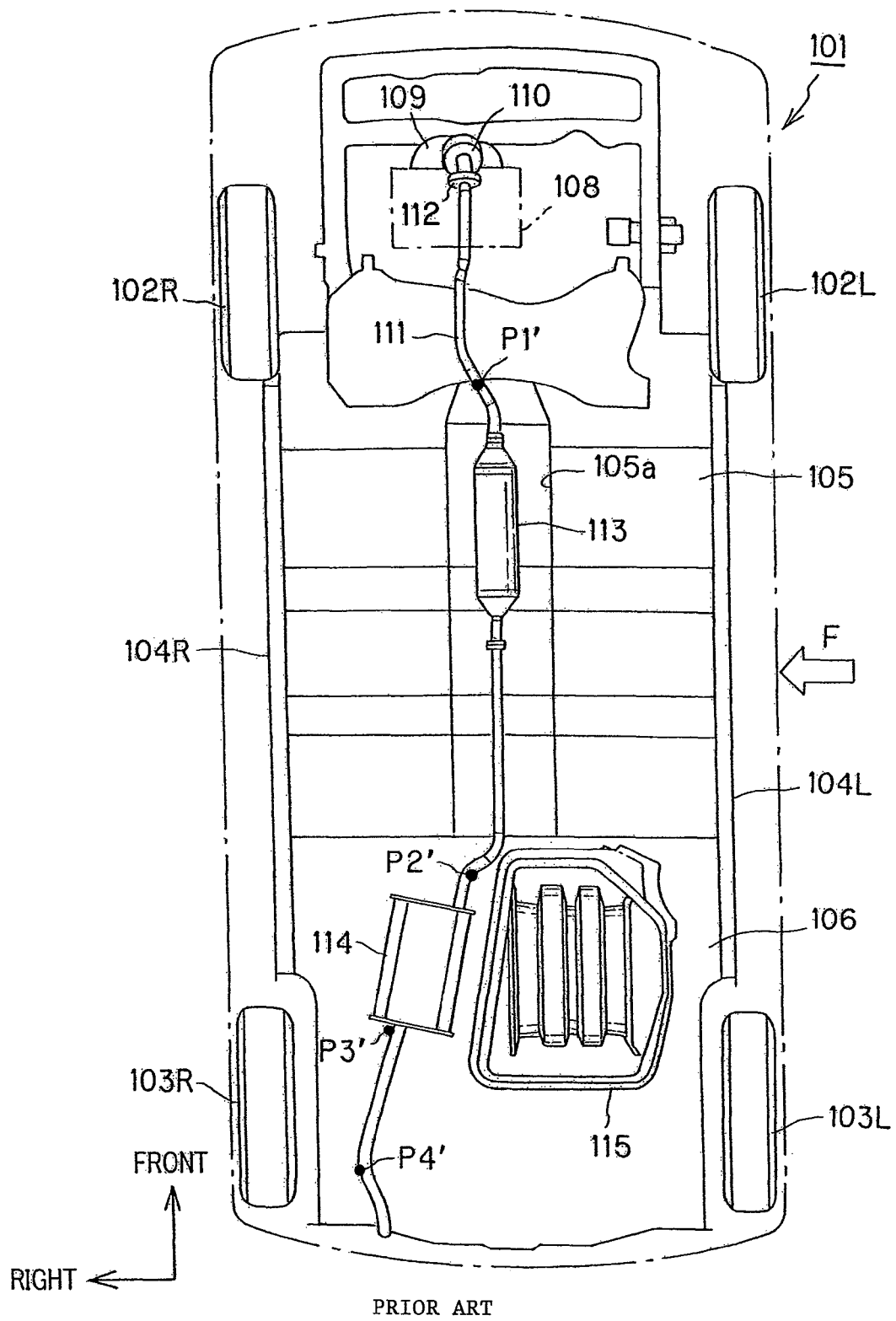
FIG. 5 is a bottom view of a vehicle showing a prior art exhaust apparatus.

In the vehicle 1 according to the embodiment, the one point P2 of the exhaust pipe 11 shown in FIG. 1 cannot be located at the front edge of the noise eliminator 114 such as P2' of the exhaust pipe 111 shown in FIG. 5 in terms of a relation such as a layout or the like. Therefore, the following problem occurs. That is, if the impact force F on the left side acts on the vehicle body by a collision on the left side of the vehicle 1 as shown in FIG. 1, although the fuel tank 15 is moved to the right together with the vehicle body, its motion is not propagated to the noise eliminator 14, so that the fuel tank 15 interferes with the noise eliminator 14.

In one embodiment, therefore, the above problem is solved by a method whereby one point (point O2 shown in FIGS. 1 and 3) of the exhaust pipe 11 and a portion (point O1 shown in FIGS. 1 and 3) on the side (right side) opposite to the side (left side) where the fuel tank 15 is arranged in the vehicle width direction for the exhaust pipe 11 in a lower surface portion of the front floor 5 are coupled by a wire 16 made of a metal having slack in an intermediate portion. A coupling structure of the metal wire 16 will now be described with reference to FIG. 4.

As shown in FIG. 4, ring-shaped joints 17 and 18 are attached to both ends of the metal wire 16. A hat-shaped bracket 19 is melt-bonded to an upper portion of the exhaust pipe 11. A screw hole 19a is formed at the center of the bracket 19.

A shoulder bolt 21 is pierced from the upward through a wave washer 20 into the joint 17 attached to one end of the metal wire 16. One end of the metal wire 16 is rotatably attached to the bracket 19 (exhaust pipe 11) around the shoulder bolt 21 as a rotational center by screwing the shoulder bolt 21 into the screw hole 19a of the bracket 19.

A shoulder bolt 23 is pierced from the downward through a wave washer 22 into the joint 18 attached to the other end of the metal wire 16. The other end of the metal wire 16 is rotatably attached to the reinforcing member 7 (front floor 5) around the shoulder bolt 23 as a rotational center by screwing the shoulder bolt 23 into a screw hole (not shown) formed in the reinforcing member 7 of the front floor 5.

In this manner, as shown in FIGS. 1 to 3, in the tunnel portion 5a formed in the front floor 5, the metal wire 16 has been coupled between the one point O1 in the lower surface portion of the front floor 5 and the one point O2 of the exhaust pipe 11 in a state where it has slack in the intermediate portion of the wire.

In the vehicle 1 having the exhaust apparatus constructed as mentioned above, if the impact force F acts on the left side panel 4L from the left side by the left side collision, the exhaust pipe 11 elastically supported at the position away from the side panel 4L and the noise eliminator 14 attached to the exhaust pipe 11 remain there due to the inertia. However, the fuel tank 15 is pressed by the side panel 4L and moved toward the noise eliminator 14 side (right side) as shown by an alternate long and short dash line in FIG. 1. At the same time, since the front floor 5 is also moved toward the noise eliminator 14 side (right side) together with the fuel tank 15, the coupling point O1 of the metal wire 16 to the front floor 5 is moved to a point O1' in FIG. 3. Therefore, the metal wire 16 is stretched by the front floor 5 and is extended like a straight line as shown by a broken line in FIGS. 1 and 3. The exhaust pipe 11 and the noise eliminator 14 provided for the exhaust pipe is forcedly moved in the moving direction (to the right) of the front floor 5 and the fuel tank 15 by the metal wire 16.

As mentioned above, according to one embodiment, in association with the movement of the fuel tank 15 to the noise eliminator 14 side (to the right), the noise eliminator 14 is also stretched by the metal wire 16 and forcedly moved in the same direction. Therefore, the interference between the fuel tank 15 and the noise eliminator 14 is prevented and the fuel tank 15 is protected. In the case where an impact force acts on the right side panel 4R from the right side by a collision on the right side, the fuel tank 15 is moved to in the direction (to the left) so as to be away from the noise eliminator 14, so that the problem of the interference between the fuel tank 15 and the noise eliminator 14 does not occur.

In another embodiment, since the metal wire 16 is ordinarily slack, the vibration of the exhaust pipe 11 is not propagated to the front floor 5 side through the metal wire 16 and the vibration of the vehicle body can be suppressed.

In one embodiment, since the metal wire 16 is arranged in the tunnel portion 5a formed in the front floor 5 as shown in FIGS. 1 to 3, the metal wire 16 is not projected downward from the bottom surface of the vehicle body. Thus there is no inconvenience as the metal wire 16 does not come into contact with an obstacle on the ground upon running of the vehicle or the like.

Further, in another embodiment, since the tunnel portion 5a of the front floor 5 is reinforced by the arch-shaped reinforcing member 7, when the load acts on the side panel 4L or 4R from the side, the deformation of the tunnel portion 5a is suppressed by the reinforcing member 7. The coupling point O1 of the metal wire 16 with the front floor 5 is certainly moved in the acting direction of the load without being obstructed by the tunnel portion 5a, and the metal wire 16 can be stretched. Interference between the fuel tank 15 and the noise eliminator 14 is thus prevented.

What is claimed is:

1. An exhaust apparatus of a vehicle in which:

a pair of right and left side panels extending in a vehicle front/rear direction are arranged between front wheels and rear wheels;

a front floor and a rear floor coupled with a rear edge portion of said front floor through a vertical wall portion are arranged between both of said side panels;

an exhaust pipe connected through a spherical joint to an engine mounted between the right and left front wheels is extended from said engine to a rear portion of the vehicle through positions under said front floor and said rear floor;

a noise eliminator is arranged in a portion of said exhaust pipe which passes under said rear floor;

a fuel tank is arranged in a side portion in a vehicle width direction of said noise eliminator; and a front portion of said exhaust pipe on a front side of said front floor and a rear portion of said exhaust pipe on a rear side of said noise eliminator are elastically mounted to a vehicle body, respectively, wherein said exhaust pipe and a portion on a side opposite to the side portion where said fuel tank has been arranged in the vehicle width direction for said exhaust pipe in a lower surface portion of said front floor, are coupled by a metal wire having slack in an intermediate portion; and wherein said metal wire is arranged in a tunnel portion formed in said front floor and projecting upward.

2. The exhaust apparatus of the vehicle according to claim 1, wherein said tunnel portion is reinforced by an arch-shaped reinforcing member and one end of said metal wire is coupled with said reinforcing member, said reinforcing member being disposed at the portion on the side opposite to the side portion where said fuel tank has been arranged for said exhaust pipe in the lower surface portion of said front floor.

* * * * *